United States Patent [19]

Basch

[11] Patent Number: 4,661,976
[45] Date of Patent: Apr. 28, 1987

[54] AUTOMATIC TELEPHONE DIALER UTILIZING AN ELECTRONIC TELEPHONE BOOK

[75] Inventor: Maxim F. Basch, Fort Lee, N.J.

[73] Assignee: MFB Enterprises, Inc., Fort Lee, N.J.

[21] Appl. No.: 854,436

[22] Filed: Apr. 21, 1986

[51] Int. Cl.⁴ .............................................. H04M 1/23
[52] U.S. Cl. ...................................... 379/354; 379/355
[58] Field of Search ............ 179/90 BB, 90 BD, 90 B, 179/90 AN

[56] References Cited

U.S. PATENT DOCUMENTS

| | | | |
|---|---|---|---|
| 3,988,550 | 10/1976 | Ts'ao | 179/90 BB |
| 4,029,908 | 6/1977 | Moseley et al. | 179/90 BB |
| 4,431,870 | 2/1984 | May et al. | 179/90 BB |

Primary Examiner—Gene Z. Rubinson
Assistant Examiner—David R. Schuster
Attorney, Agent, or Firm—Siegmar Silber

[57] ABSTRACT

An automatic telephone dialer device comprising, in combination:
  an electronic telephone book with a plurality of pages, each with a capability for having listed thereon a plurality of entries in a column and line array;
  random access memory means for storing at predetermined locations encoded data corresponding to each said entry;
  microprocessor means for cooperative functional relationship with said memory means by receiving encoded data for locating in a predetermined location of said memory means, by providing an address accumulator for predetermining locations within said memory means, and by retrieving by random access the encoded data from the predetermined locations;
  one or more signal generators for providing, in response to encoded data received from the microprocessor means, a chain of signals to telephone lines;
  a plurality of page sensors transmitting a signal representing the page being viewed;
  a plurality of column and line actuators, each operable to a condition representing the column and line selected;
  whereby, upon operation for telephone dialing purposes and upon a complete location being received by the address accumulator, data is transmitted from memory means to the data buffer of the microprocessor means, and a telephone number is automatically dialed by signals generated by the signal generator.

27 Claims, 3 Drawing Figures

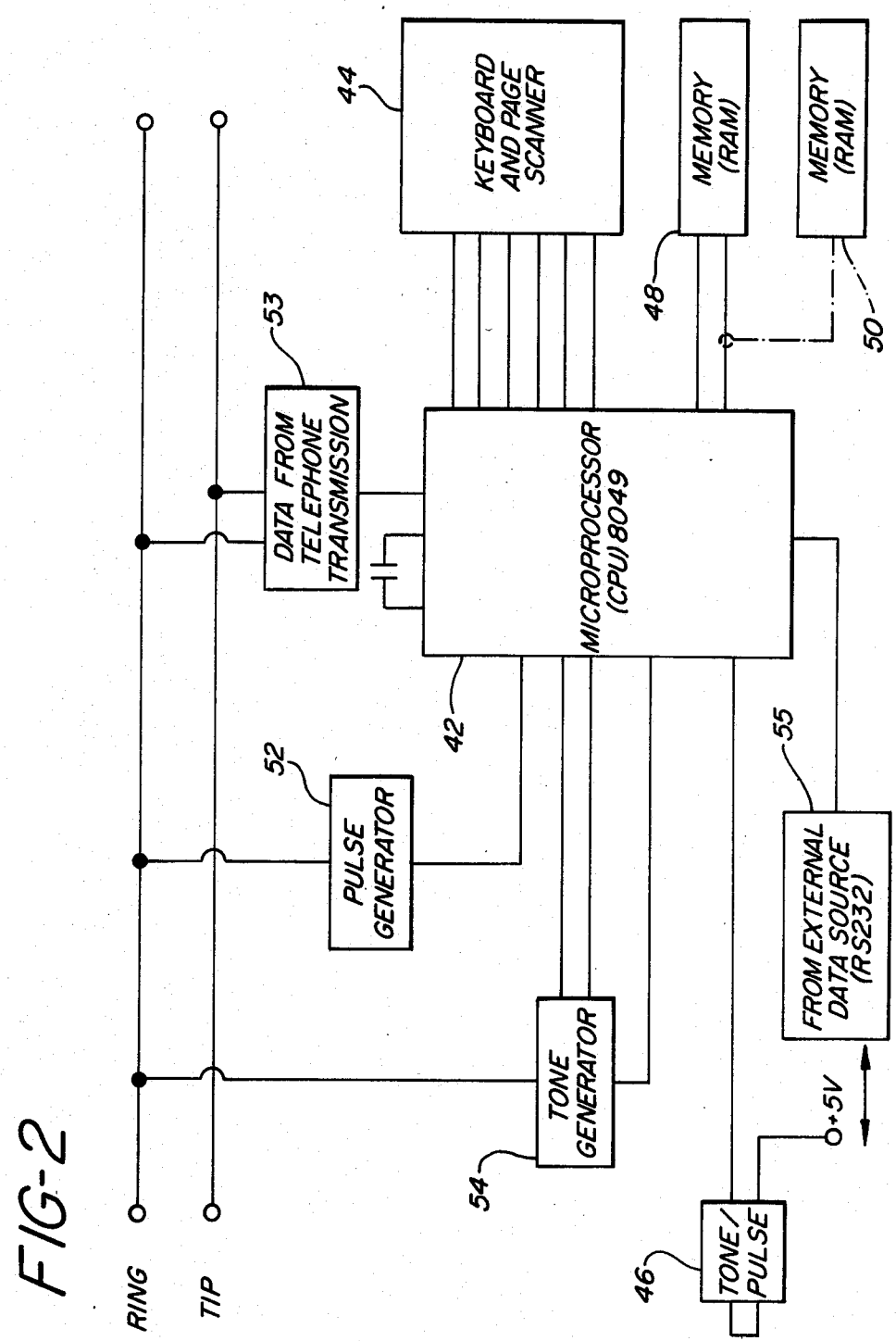

AUTOMATIC TELEPHONE DIALER UTILIZING AN ELECTRONIC TELEPHONE BOOK

BACKGROUND OF THE INVENTION

1. Field of the Invention

The invention relates generally to an automatic telephone dialer which utilizes an electronic telephone book for providing ready access to a relatively large number of listings.

2. Disclosure Information Statement

In preparation for this application, a patentability search was conducted in Class 379/Subclass 359, 179/90AD, and 179/90BB. The search uncovered the following patents:

| Patent No. | Inventor | Date of Issue |
|---|---|---|
| 4,431,870 | May et al | 2/14/84 |
| 4,029,908 | Moseley et al | 6/14/77 |
| 3,988,550 | Ts'ao | 10/26/76 |
| 3,940,573 | Healy et al | 2/24/76 |
| 3,928,731 | Cohen | 12/23/75 |
| 2,953,647 | Johanson | 9/20/60 |
| 2,941,043 | Ham, Jr., et al | 6/14/60 |
| Other References | | |
| IBM/TDB, V.15,No. 7 p. 2197 and 8 | Delmege, Jr. | 12/721 |
| German Patent Publication DE 3011511 A 1 | Thies | 1/10/82 |

Reference to the patent to Ts'ao '550 revealed a repertory dialer. This repertory dialer has a number storage and number recall system, which system is more technically sophisticated than the earlier inventions to Hamm, Jr. et al '043 and Johanson '647. In Ts'ao '550, the description is provided of entering a number into storage and correspondingly of reading a number stored in the repertory. Both a-c signal and d-c impulse operations are taught. Further, with the above listed patents on hand, the present application is posited as certain technological problems previously unresolved, are responded to thereby. The instant invention of an automatic telephone dialer combines a three coordinate storage structure with random (rather than sequential) access to memory; a central processing unit combined with an electronic telephone book; and, an operator "friendly" entry and retrieval arrangement.

SUMMARY AND OBJECTS

The electronic telephone book and associated dialer device of this invention provides an electronic telephone book having a plurality of pages. Each page has the capacity for entering a plurality of listings thereon. The device includes a memory for storing encoded data corresponding to each of the entries. As each page is selected a page sensor is actuated and provides an indication to the microprocessor the partial address, namely, the page number. Adjacent each entry of the electronic telephone book, there is a pushbutton or switch which provides the x-y matrix or column and line portion of the address. Upon completion of an address, that is all three parts of it are provided, a microprocessor depending upon the function selected will direct encoded data to the memory or alternatively will decode the stored encoded data and provide to a generator information for automatic dialing. This latter function is through either a pulse or a tone generator.

It is an object of this invention to provide an improved automatic dialer for telephones having access to a large number of telephone numbers stored in a multipage array.

It is a further object of this invention to provide a user friendly device in which it is easy to enter newly acquired data, easy to delete numbers, and easy to dial out to the selected number.

It is a yet further object of this invention to provide a self-contained electronic phone book.

It is a still yet further object of this invention to provide multifunction selection scheme with fixed array of pushbuttons, selection includes line, column and page information.

It is feature of the present invention to provide single pushbutton operation for dialing from large repertory.

It is another feature of the present invention to provide compatibility with both pulse and tone dial systems.

It is yet another feature of the present invention to provide a device which is programmable from remote databases via telephone lines; data communication lines; or manual input from keyboard.

It is still another feature of the present invention to provide the capability to stand alone or to be incorporated into telephone sets, paging devices, pbx's, intercom systems and the like.

Yet another feature of the present invention is to provide a microprocessor for continuously scanning page selection data for proper page indication.

An additional feature of the present invention is that the illustrated 12×10×2 matrix (12 pages, 10 lines, and 2 columns) can be expanded to unlimited capacity with extra modules.

Yet another feature provides a directory that can be generated automatically to predetermined format or can be manually constructed.

Yet another feature of the present inventions provides a multipage device which is economical and reliable.

BRIEF DESCRIPTION OF THE DRAWINGS

These and other objects will be readily evident, upon a study of the following specification, and the accompanying drawing, wherein:

FIG. 2 is a block diagram of the automatic telephone dialer of FIG. 1; and,

DESCRIPTION OF THE PREFERRED EMBODIMENT

Figure 1:
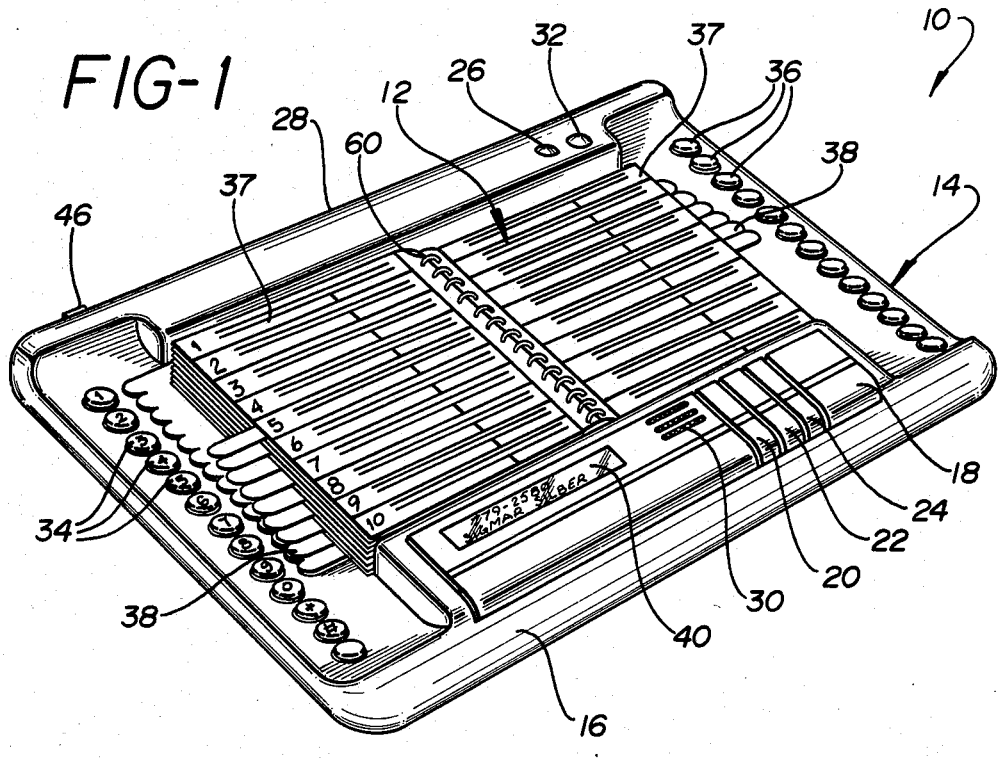
FIG. 1 is a perspective view of the automatic telephone dialer utilizing an electronic telephone book of the present invention.

Referring now to FIG. 1 an automatic telephone dialer, generally designated by the reference number 10, is shown. The automatic telephone dialer utilizes an electronic telephone book which, in turn, is generally designated by the reference number 12. The automatic telephone dialer 10 includes a cabinet 14 for supporting the electronic telephone book 12, for housing the operating controls of the dialer, and for housing the dialer circuitry described in detail hereinbelow. Although, as shown in FIG. 1 by way of example, a 2×10 page array or two columns by ten lines is illustrated, any number of arrays are anticipated with at least 2×10, 4×16, 6×20, and 8×32 now at hand. Below the electronic telephone book, at the lower edge 16 of cabinet 14, the telephone dialer is structured to provide power switch 18 and associated mode selector switches 20, 22 and 24. Power switch 18 is designed to apply power to the unit and, upon a power failure or disconnect from source of a-c voltage to apply power from back-up battery source. An associated "LOW" battery condition indicator lamp 26 is provided at the upper edge 28 of cabinet 14.

Returning to the selector switches, the normal mode of the automatic telephone dialer 10, upon application of power, is the "dial" mode. The "redial" switch 20 is constructed to provide repetition of a previously automatically dialed number and to provide an "enter" function in the manual data entry mode. "Program" switch 22 is included to remove the dialer 10 from the normal "dial" mode and to enter a manual data entry or program mode. "Pause" switch 24 is included to enter a space or a blank when manually entering data. In conjunction with the dialer function, loudspeaker 30 is provided. Further, in conjunction with the memory function, an associated "MEMORY FAILURE" condition indicator lamp 32 is provided at the upper edge 28 of cabinet 14.

In cooperative relationship with the illustrated 2×10 column-and-line array, the automatic telephone dialer 10, is structured to include two sets or rows of pushbuttons or column and line actuators 34 and 36. Pushbuttons 34 are dual functioning and are used for manual data entry and automatic dialing selection from column 1. Pushbuttons 36 are used solely for automatic dialing selection from column 2. While pushbuttons are described and shown in a row arrangement, other switch elements, such as membrane key elements, and other arrangements, such as keypad arrangements, may be utilized. In the embodiment shown in FIG. 1, the electronic telephone book 12 is illustrated as including a plurality of pages 37 each of which in turn, is displayed as including a tab-like projection 38 and each page operates in conjunction with a page sensor described hereinbelow. In the best mode of this invention shown herein, adjacent the lower edge of the page 37 of electronic telephone book 12, the automatic telephone dialer 10 is structured to include a display 40 for displaying data being manually assembled for entry into memory and for displaying data being retrieved from a given address or predetermined location. Although the display 40 is not a required aspect of invention, especially when the memory has been provided with externally assembled data, the display facilitates efficient utilization. Further and also in the best mode hereof, the display 40 is a two line display which enables the operator to view the descriptive or instructional information stored along with the telephone number.

Referring now to FIG. 2, a block diagram is shown of the automatic telephone dialer 10 utilizing the electronic telephone book 12 and includes a microprocessor or central processing unit (CPU) generally designated by reference number 42. The CPU 42 is mounted within cabinet 14 and, for programming and dialing, is functionally cooperative with the keyboard and page scanner circuitry 44. The keyboard circuitry 44 mounted within cabinet 14 is connected in turn to pushbuttons 34 and 36, and mode selector switches 20, 22 and 24. A further mode selector, namely tone/pulse selector 46, is constructed to direct output for automatic dialing to the telephone-system-appropriate generator. While for a given system where the device is built-in to the telephone instrument, either a pulse generator or a tone generator may be included; for the use as a telephone accessory, it is considered preferable in an automatic telephone dialer 10 of this type to provide the option of generator selection. The scanner circuitry 44 is connected to the page sensor which is responsive to encoded portions of each page or identifiers contained in the tab like projections 38. While the CPU 42 of the best mode is an Intel 8049 (manufactured by Intel Corp., Santa Clara, California) microprocessor, any equivalent device may be employed. The CPU 42 is further connected to a random access memory (RAM) unit 48, and optionally to an additional RAM 50, to place in memory and retrieve therefrom numbers to be dialed or data to be transmitted. While the RAM units 48 and 50 are Toshiba 2K×8 CMOS memories (distributed by Toshiba America, Inc., New York, NY), equivalent memory devices may be employed. The CPU 42 is yet further connected to pulse generator 52 and tone generator 54 for providing the system appropriate pulse or tone outputs in response to CPU 42 output.

Figure 3:
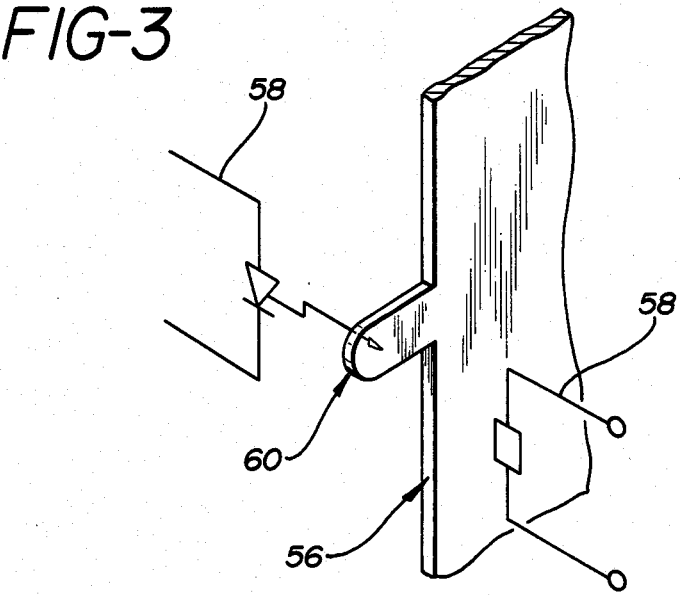
FIG. 3 is a schematic diagram of the page sensor of the electronic telephone book of FIG. 1.

The automatic telephone dialer 10 is structured to include input ports 53 and 55 which provide for receiving externally assembled data, of which port 53 is for receiving data from telephone transmissions and port 55, an RS-232 port, is for receiving data from computers or communications devices. The page sensor, referred to generally as 56, is shown in FIG. 3. The page sensor 56 includes a plurality of photoelectric cells 58 which cells in turn are interrupted by a page element 60. The page sensor 56 gathers information from the array of interrupted and uninterrupted photoelectric cells 58 and decodes the information to provide a portion of the address. While an optoelectronic sensor device is hereinbefore described, it is understood that magnetic, mechanical, piezoelectric and other sensors may be used.

Prior to describing the operation of the above device a brief description of the embedded programs is provided as these programs provide functional directions for the microprocessor. The description which follows ties together the mechanical arrangement of FIG. 1 and the schematic description of FIG. 2. As indicated hereinabove the automatic telephone dialer operates primarily in two modes, namely, the dialer mode and the program mode. The mode select is as follows: (1) the dialer mode is initiated upon power "ON" and (2) the program mode is initiated upon "program" switch being depressed. In the dialer mode an address detection subprogram corresponds the simultaneous scanning of the page sensor and pushbuttons to ascertain the full page, column and line address selection. When an address is completed (usually by the depressing of a pushbutton 34 or 36) the information in the address memory is transmitted and data retreival ensues. A data retreival subprogram is then initiated which reads the data from the address provided and copies the information to be retreived from memory to a dialer buffer and to one of the display buffers. Further, subroutines then transfer data from the dialer buffer to the previously selected signal generator (either pulse or tone) which in turn generate a chain of pulse or tones for automatic dialing purposes. Simultaneously the data from the display buffer is then shown on the two-line display monitor for the user's purposes. Typically the additional information displayed could provide to the user information such as name and title of person dialed, account number, and account aging data, abbreviated information about last contact and the like.

In the various program modes, the embedded program information has similar functional roles. The description of the program modes needs to take into account that data may be introduced: (1) by manual operation of the keyboard; (2) receiving data transmitted via telephone lines; and, (3) receiving data transmitted from other computer/communications sources via a RS-232 port. The following description basically follows for convenience the manual program mode in which the user has control of address and entry of data. In those modes, when the automatic telephone dialer is part of a larger information system, the user may have certain areas of memory which are subject to external control. The subprograms in these modes have similarities for local or external control and where differences do exist then these are highlighted parenthetically herein. The locally controlled, manual data input mode is entered by depressing program selector switch 22. (An independent subprogram from the above entails the mode selection between internal and external receiving of programmed data. Thus, a data source detection subprogram ascertains whether the internal program mode is entered or whether information is being received from the telephone line or is present at the RS-232 port.) In general terms, an address detection subprogram (address directing subprogram for external control) is provided where an address for the data being provided is first entered into the address memory. This process is further facilitated by a page subprogram for continuously scanning the page sensors and for providing data representing the page part of a predetermined location to the address accumulator, and by a column and line subprogram for continuously scanning the condition of the column and line actuators and for providing data representing the column and line part of a predetermined location to the address accumulator. Thereupon, a data accumulation program assembles data entered during programming into a temporary buffer. Simultaneously, in the manual programming mode the data being accumulated is also assembled in the display buffer and the display operation subprogram described above transfers the data from the display buffer to the two line display. A data validation subprogram thereupon responds to a termination code being received and transfers the data from the temporary buffer into memory at a preselected address. The termination code in the manual program is initiated by depressing the "redial" switch (and in telephone or computer/communications transmitted data is incorporated at the end of the coded material being sent). Both the internally and externally applied data utilizes the same data buffer. With the capability just described an organization having the automatic telephone dialer of the present invention can electronically communicate with its personnel. Such information could include sales leads for a given time period; new company directory reflecting changes in staff, name, address and telephone numbers of company facilities, data on distributors in the region; and, various other listing functions.

In operation, the page sensor 56 continuously monitors and provides to the page scanner 44 page selection information. Without depressing any of the mode selector switches the application of power through on-off switch 18 places the automatic telephone dialer 10 into the automatic telephone dialing mode. In this mode upon the depression of pushbuttons 34 or 36 the telephone number entered in the correspondingly addressed memory location will be retrieved and transmitted to the microprocessor. The three-part address is formed by a selection of page, column and line with the tone/pulse selector 46 set to a given position, for example, "pulse" the retrieved data will be provided by the CPU 42 to the generator 52 which in turn provides the pulse stream generated to the telephone circuit.

Turning now to the operation for purposes of programming a given number into a selected address loction the electronic telephone book 12 is first opened to a page 37 and the name, address and telephone number is written in the notepad provided. Thereafter, the "program" selector switch 22 and the pushbutton 34 or 36 adjacent the address just recorded are depressed until an audible signal is heard (approximately 3 seconds). After the audible signal, the number to be entered in memory is formed by depressing pushbuttons 34 in the proper order. Upon completion of the number, depressing "redial" selector switch insures the completion of the entering procedure. Frequently in the entering procedure for a telephone number a pause may be required in the dialing sequence. This pause is provided by depressing pushbutton 24 for pause simulation and then continuing with the chain of numbers indicated in the list being entered. The pause is designed to provide a two-second delay as may be indicated.

Although the best mode of the invention has been described herein in some detail, it has not been possible to include each and every variation. Those skilled in the art of automatic telephone dialing equipment will be able to make slight variations in the mechanical and electrical arrangement suggested hereby without departing from the spirit of the invention and still be within the scope of the claims appended hereto.

What is claimed is:

1. An automatic telephone dialer device comprising, in combination:
    an electronic telephone book with a plurality of pages, each with a capability for having listed thereon a plurality of entries in a column and line array;
    random access memory means for storing at predetermined locations encoded data corresponding to each said entry;
    microprocessor means for cooperative functional relationship with said memory means by receiving encoded data for locating in a predetermined location of said memory means, by providing an address accumulator for predetermining locations within said memory means, and by retrieving by random access the encoded data from the predetermined locations;
    one or more signal generators for providing, in response to encoded data received from the microprocessor means, a chain of signals to telephone lines;
    a plurality of page sensors transmitting a signal representing the page being viewed;
    a plurality of column and line actuators, each operable to a condition representing the column and line selected;
    said microprocessor means, in turn, further comprising:
        page subprogram means for continuously scanning the page sensors and for providing data representing part of a predetermined location to the address accumulator;
        column and line subprogram means for continuously scanning the condition of the column and line actuators and for providing data representing part of a predetermined location to the address accumulator; and one or more data buffers for holding data prior to transmittal to the signal generator and prior to transmittal to the predetermined location in said memory means;

whereby, upon operation for telephone dialing purposes and upon a complete location being received by the address accumulator, data is transmitted from memory means to the data buffer of the microprocessor means, and a telephone number is automatically dialed by signals generated by the signal generator.

2. An automatic telephone dialer device as described in claim 1 wherein one signal generator is included and said signal generator is a pulse generator.

3. An automatic telephone dialer device as described in claim 1 wherein one signal generator is included and said signal generator is a tone generator.

4. An automatic telephone dialer device as described in claim 1 wherein two signal generators are included, one being a pulse generator and the other a tone generator, and the automatic telephone dialer device further comprises:

a pulse/tone selector means operable between a pulse position and a tone position for selecting the telephone-system compatible signal generator.

5. An automatic telephone dialer device as described in claim 1 wherein said column and line actuators are an array of a plurality of pushbuttons with each one of said plurality of pushbuttons corresponding to a separate column and line.

6. An automatic telephone dialer device as described in claim 5 wherein said pushbuttons are arrayed in rows adjacent the electronic telephone book and included markings on each pushbutton corresponding to a line designation on each page of the electronic telephone book.

7. An automatic telephone dialer device as described in claim 6 wherein said automatic telephone dialer device further comprises:

program mode switch means operable between an "on" position and an "off" position for enabling manually programmed data to be entered into said memory means.

8. An automatic telephone dialer device as described in claim 7 wherein when the program mode switch means is at the "on" position one of said rows of said pushbuttons provides a means of keying data to be entered into memory means.

9. An automatic telephone dialer device as described in claim 1 wherein said automatic telephone dialer device further comprises:

program mode switch means operable between an "on" position and an "off" position for enabling manually programmed data to be entered into said memory means.

10. An automatic telephone dialer device as described in claim 9 wherein said column and line actuators rows of a plurality of membrane key elements with each said membrane key elements thereof is arrayed adjacent a line of a page of the electronic telephone book and wherein, when the program mode switch means is at the "on" position, one row of said membrane key elements provides a means of keying data to be entered into said memory means.

11. An automatic telephone dialer device as described in claim 9 wherein said column and line actuators are an array of membrane key elements in a keypad arrangement.

12. An automatic telephone dialer device as described in claim 11 wherein during dialer operation, the column and line actuation results from entering the number of the corresponding line on the page of the electronic telephone book on the keypad.

13. An automatic telephone dialer device as described in claim 12 wherein, during manual data entry operation, the membrane key element keypad provides a means of keying data to be entered into said memory means.

14. An automatic telephone dialer device as described in claim 9 wherein said column and line actuators are an array of pushbuttons in a keypad arrangement.

15. An automatic telephone dialer device as described in claim 14 wherein the column and line actuation results from entering the number of the corresponding line on the page of the electronic telephone book on the keypad.

16. An automatic telephone dialer device as described in claim 15 wherein, during manual data entry operation, the pushbutton keypad provides a means of keying data to be entered into said memory means.

17. An automatic telephone dialer device as described in claim 1 wherein said automatic telephone dialer device further comprises:

a display means for displaying data being manually assembled for entry into said memory means and for displaying data being retrieved from a predetermined location; and, said microprocessor means, in turn, further comprises:

one or more display buffers for holding data prior to transmittal to the display means.

18. An automatic telephone dialer device as described in claim 17 wherein said display is a two-line display and is adjacent the electronic telephone book enabling the device user to verify to information retrieved and to update the entry on the page of the electronic telephone book, said two-line display providing descriptive data in addition to the telephone number.

19. An automatic telephone dialer device as described in claim 9 wherein said automatic telephone dialer device further comprises:

a redial actuator operable during dialer operation to repeat the most recently dialed telephone number and operable during data entry operation to provide an enter signal whereupon data in the data buffer is entered into the memory means at the predetermined location.

20. An automatic telephone dialer device as described in claim 1 wherein said automatic telephone dialer device further comprises:

external data detect means for indicating to the microprocessor means, the presence of external data for entry into said memory means at predetermined locations.

21. An automatic telephone dialer device as described in claim 20 wherein said predetermined loctions thereof are exclusive of certain pages into which only manually assembled data is programmed.

22. An automatic telephone dialer device as described in claim 20 wherein said external dialer device means is responsive to telephone transmitted data and to computer generated data.

23. An automatic telephone dialer device as described in claim 1, wherein said page sensors are optocoupled devices in which photoelectric sensing results when the page element interrupts the coupling and a signal representing the page being viewed is decoded at the microprocessor means by the page subprogram means.

24. An automatic telephone dialer device as described in claim 1, wherein said page sensors are magnetically coupled devices in which magnetic sensing results when the page element interrupts the coupling and a signal representing the page being viewed is decoded at the microprocessor means by the page subprogram means.

25. An automatic telephone dialer device as described in claim 1, wherein said automatic telephone dialer device further comprises:
a battery power backup means for providing power to the memory means and for precluding loss of data at the memory means during a power outage.

26. An automatic telephone dialer device as described in claim 25 wherein said battery power backup means further includes a low battery warning indicator lamp.

27. An automatic telephone dialer device as described in claim 1, wherein said microprocessor means includes error check subprogram means for checking encrypted data within the data retrieved and data to be entered; and, a "memory failure" indicator lamp which is lit when a failure is detected.

* * * * *